(12) United States Patent
Wirth (10) Patent No.: US 12,215,783 B2
(45) Date of Patent: Feb. 4, 2025

(54) FRICTION BRAKE AND VEHICLE POWER SHIFT TRANSMISSION HAVING SAME

(71) Applicant: MAHLE International GmbH, Stuttgart (DE)

(72) Inventor: Christian Wirth, Mossinning (DE)

(73) Assignee: Mahle International GmbH (DE)

( * ) Notice: Subject to any disclaimer, the term of this patent is extended or adjusted under 35 U.S.C. 154(b) by 9 days.

(21) Appl. No.: 18/134,558

(22) Filed: Apr. 13, 2023

(65) Prior Publication Data
US 2024/0060562 A1 Feb. 22, 2024

(30) Foreign Application Priority Data
Apr. 14, 2022 (DE) ............ 10 2022 203 789.8

(51) Int. Cl.
*F16H 61/32* (2006.01)
*F16H 63/30* (2006.01)
*F16H 61/28* (2006.01)

(52) U.S. Cl.
CPC ......... *F16H 61/32* (2013.01); *F16H 63/3043* (2013.01); *F16H 2061/2884* (2013.01); *F16H 2063/3063* (2013.01)

(58) Field of Classification Search
CPC ............. F16H 61/32; F16H 2061/2884; F16H 63/3043; F16H 2063/3063; B62M 11/14
See application file for complete search history.

(56) References Cited

U.S. PATENT DOCUMENTS

| | | | |
|---|---|---|---|
| 4,178,814 A | 12/1979 | Ahlen | |
| 6,085,880 A | 7/2000 | Kuhn | |
| 7,815,021 B2 | 10/2010 | Baumgartner | |
| 11,247,749 B2 | 2/2022 | Hinterkausen | |
| 2003/0199356 A1* | 10/2003 | Biallas | F16H 57/10 475/154 |
| 2010/0109427 A1 | 5/2010 | Baumann | |
| 2011/0287884 A1* | 11/2011 | Unno | F16H 61/0059 475/140 |
| 2013/0190129 A1 | 7/2013 | Hoots | |

(Continued)

FOREIGN PATENT DOCUMENTS

| | | |
|---|---|---|
| DE | 3929250 A1 | 3/1991 |
| DE | 102006029942 A1 | 8/2007 |

(Continued)

OTHER PUBLICATIONS

United Kingdom Combined Search and Examination Report dated Sep. 8, 2023 for United Kingdom Patent Application No. 2304410.0.

(Continued)

*Primary Examiner* — Lori Wu
(74) *Attorney, Agent, or Firm* — Fishman Stewart PLLC (57) ABSTRACT

A friction brake for a vehicle power shift transmission is disclosed. The friction brake includes a load gear that is rotatably driveable about a centre longitudinal. A friction braking device is provided for decelerating and/or fixing the load gear. An actuating device for actuating the friction braking device, the actuating device includes an moveable spreading piston. The moveable spreading piston while performing a spread along the centre longitudinal axis automatically materialising as a function of a load torque provided on the load gear, provides a braking force for actuating the friction braking device.

20 Claims, 3 Drawing Sheets

(56) References Cited

U.S. PATENT DOCUMENTS

2015/0068852 A1* 3/2015 Weber .................... F16D 65/52
                   188/71.8
2019/0011037 A1   1/2019   Iwai

FOREIGN PATENT DOCUMENTS

| | | |
|---|---|---|
| DE | 102007020503 A1 | 11/2008 |
| DE | 102016216557 B3 | 12/2017 |
| DE | 102016214694 A1 | 2/2018 |
| DE | 102017216502 A1 | 1/2019 |
| DE | 102017122294 A1 | 3/2019 |
| DE | 102017125068 A1 | 5/2019 |
| DE | 102018212433 A1 | 1/2020 |
| DE | 102018212435 A1 | 1/2020 |
| DE | 102018220807 A1 | 6/2020 |
| WO | 2012156613 A1 | 11/2012 |

OTHER PUBLICATIONS

English abstract for DE-102017216502.
English abstract for DE-102018212433.
English abstract for DE-102018212435.
English abstract for DE-102017122294.
English abstract for DE-102017125068.
English abstract for DE-102018220807.
English abstract for DE-102016214694.

* cited by examiner

FRICTION BRAKE AND VEHICLE POWER SHIFT TRANSMISSION HAVING SAME

CROSS-REFERENCE TO RELATED APPLICATION

This application claims priority to German Application No. DE 10 2022 203 789.8 filed on Apr. 14, 2022, then contents of which are hereby incorporated by reference to its entirety.

TECHNICAL FIELD

The invention relates to a friction brake. In particular, the invention also relates to a vehicle power shift transmission equipped with at least one such friction brake.

BACKGROUND

With known friction brakes, it is difficult to adapt the realisable braking force to a load torque to be absorbed by the friction brake.

The object of the invention therefore consists in stating an improved or at least another embodiment for a friction brake.

With the present invention, this object is achieved in particular through the subjects of the independent claim(s). Advantageous embodiments are subject of the dependent claims and of the description.

SUMMARY

The basic idea of the invention consists in particular in forming a friction brake so as to be self-boosting and/or self-adjusting such that it provides a braking force as a function of a load torque to be absorbed.

To this end, a friction brake, in particular a self-boosting and/or self-adjusting friction brake for a vehicle power shift transmission is provided according to the invention, for example for a vehicle power shift transmission, for example a vehicle power shift transmission of a vehicle driveable by motor power and/or pedal power, in particular a bicycle power shift transmission of a bicycle, for example an electric bicycle. An electric bicycle according to the invention means for example an electric bicycle (E-bike), in which the motor power can be substantially independent of the pedal power or an electric bicycle equipped with an electric auxiliary motor, in the case of which the motor power is employed in a pedal power-assisting manner and in particular dependent on the vehicle speed. The friction brake according to the invention comprises a load gear that is rotatably driveable about a centre longitudinal axis, in particular realised by a load gear wheel coupled or coupleable to a vehicle power shift transmission or bicycle power shift transmission. The load gear can be imparted an external load torque, for example by the said vehicle power shift transmission or bicycle power shift transmission, so that it is rotatably driveable about the centre longitudinal axis. Furthermore, the load gear is assigned an actuatable friction braking device of the friction brake, which is equipped for decelerating and/or fixing the load gear. It is substantial that the friction brake has an actuating device assigned to the friction braking device for actuating the same, wherein the actuating device has a spreading piston that is moveable in its entirety along the centre longitudinal axis. The spreading piston is equipped in order to perform an automatically materialising spreading along the centre longitudinal axis as a function of a load torque (or load moment) provided on the load gear, as a result of which a quasi-load torque-dependent braking force for actuating the friction braking device is providable or provided. By way of the provided braking force the load gear can be decelerated or fixed. Because of this, the friction brake can automatically, in particular without further electronic resources, generate an in particular boosted braking force adapted in the amount to the load torque present on the load gear. This has the advantage that the friction braking device is reliably loadable and actuatable with an optimal and load torque-dependent braking force, so that the load gear can be relatively briskly decelerated and/or fixed.

Accordingly, the expression "self-boosting friction brake" practically refers to the function of the friction brake of automatically adjusting a braking force as a function of the load torque provided on the load gear, wherein in particular a greater load torque on the load gear has an increased braking force as a consequence. The load torque can be realised in particular by a load moment.

As mentioned, it can be practically provided that the load gear is configured as load gear wheel, so that it is coupleable or coupled in mesh with an external gear wheel. This allows a relatively simple introduction or imparting of an external load torque, for example a torque provided on the load gear wheel by a vehicle power shift transmission or bicycle power shift transmission. Practically, the friction brake can be additionally equipped with a coupling gear wheel device arranged on the outer housing of the friction brake from the outside, for example a double gear wheel mounted on the outer housing of the friction brake for providing a transmission ratio, which on the one hand meshes with the load gear, in particular the load gear wheel of the friction brake and on the other hand with an output of the vehicle power shift transmission or bicycle power shift transmission.

It is practical, furthermore, when the said spreading piston, as part of a working movement and in particular in its entirety, can be actively moved back and forth between at least one basic position, in which it is in particular completely lifted off of the friction braking device, so that the friction braking device is deactivated—i.e. not actuated—and the load gear is released without deceleration, and a starting position spaced apart in the direction of the centre longitudinal axis in this regard, in which the spreading piston touchingly lies against the friction braking device and the load gear is released without deceleration or practically without deceleration, i.e. in particular with the help of further means of the friction brake, and can automatically change from the starting position into a braking position. The starting position can be understood as an intermediate position, in which the spreading piston, without generating braking force to speak of, gently lies against the friction braking device so that the friction braking device is basically actuated but does not yet provide any noticeable deceleration of the load gear. Furthermore, the spreading piston can automatically change from the said starting position into the said braking position, in which the spreading piston is supported touchingly, and subject to imparting a substantial braking force, on the friction braking device, so that the same is actuated and the load gear decelerated or fixed. Practically, the substantial braking force is greater by at least the factor 10, 100, or 1000 than the braking force in the starting position. The automatic change of the spreading piston from the starting position into the braking position can be realised by means of a screw drive of the spreading piston. In the state (starting state) in which it is gently applied to the friction braking device, the load torque provided on the load gear is frictionally transmitted as actuating torque to the spreading piston by way of the friction braking device, wherein the screw drive translates the actuating torque into an axial spreading of the spreading piston longitudinally to the centre longitudinal axis. The said actuating torque present in the starting position can be practically smaller by the factor 10, 100, 1000 than the said load torque. In the braking position, the braking force is practically provided as a function of the load torque provided on the load gear in that the load torque is completely transmitted by way of the friction braking device subject to sliding friction and/or adhesive friction as actuating torque to the screw drive of the spreading piston. In other words, the screw drive can translate the actuating torque provided from the load torque into a spreading of the spreading piston longitudinally to the centre longitudinal axis, as a result of which a load torque-dependent braking force is provided.

It is practical when the load torque provided on the load gear is frictionally transmitted as actuating torque to the spreading piston by means of the friction braking device, wherein a screw drive of the spreading piston translates the actuating torque into a spreading of the spreading piston longitudinally to the centre longitudinal axis.

Practically, the working movement of the spreading piston takes place longitudinally and/or linearly to the centre longitudinal axis. As part of the working movement, the spreading piston or at least one of its components can rotate, at least within certain limits about the centre longitudinal axis. Practically, the spreading piston is round-cylindrical in shape and with respect to the centre longitudinal axis arranged coaxially. The spreading piston can be resiliently mounted on an outer housing of the friction brake, it can be arranged for example between two coil springs so that quasi-longitudinally of the centre longitudinal axis a floating mounting of the spreading piston is realised. The spreading piston can be spring-elastically preloaded for example in one of its basic positions.

According to the invention, a screw drive is to mean in particular a gearing, which is equipped for converting a rotary movement (for example rotation of the load gear and/or that of a component of the friction braking device) or an imparted torque (actuating torque) into a longitudinal movement (spreading of the spreading piston).

Practically, the screw drive can be realised by a ball screw drive. Practically, such a ball screw drive comprises at least one component that is axially fixed but rotatable with respect to the centre longitudinal axis, a further component that is axially moveable but non-rotatable with respect to the centre longitudinal axis and balls mounted between these two components. Because of this, a cost-effective embodiment for a screw drive is stated. Other screw drive designs can likewise be employed.

Furthermore, it can be provided that the screw drive or a ball screw drive forming the same is arranged on an actuating ring of the spreading piston or formed by the same. Furthermore, the screw drive or a ball screw drive forming the same can be embodied so as to be self-locking. Practically, the self-locking of the screw drive can be brought about by the interaction of the screw drive with at least one further component of the friction brake, for example the friction braking device and/or a screw runner of the actuating device. By way of the self-locking function, it is achieved in the braking position of the spreading piston that a spreading of the spreading piston set at a specified load torque is maintained unchanged even with, by contrast, a falling load torque or with an entirely absent load torque, i.e. a maximum spread of the spreading piston longitudinally of the centre longitudinal axis, once attained is locked or fixed so that the spreading piston is automatically supported on the friction braking device, unchanged, and the load gear is decelerated or fixed.

It is practical, when the ball screw drive comprises the following separate components: a friction ring arranged coaxially to the centre longitudinal axis, that is longitudinally moveable axially with respect to the actuating ring and rotatably adjustable with respect to the actuating ring in a circumferential direction round about the centre longitudinal axis, which friction ring has at least one friction ring ball ramp of circular or arcuate configuration, at least one actuating ring ball ramp of circular or arcuate configuration arranged on the actuating ring, a ball ring cage carrying at least one ball and arranged coaxially to the centre longitudinal axis. It can be provided that in the assembled state of the friction brake the friction ring, with the interconnection of the ball ring cage, is arranged on the actuating ring, wherein the ball ring cage is preferably arranged sandwich-like between the friction ring and the actuating ring so that the at least one ball dips into the at least one friction ring ball ramp and into the at least one actuating ring ball ramp and guided therein in each case. This arrangement represents a preferred embodiment of a screw drive which translates a rotational rotary movement of the friction ring relative to the actuating ring into a translational actuating movement of the actuating ring or friction ring relative to the centre longitudinal axis, depending on which ring is held fixed. Here it is practical when the friction ring, in the starting position and/or the braking position of the spreading piston is touchingly supported, i.e. fixed on the friction braking device while imparting a braking force. Concretely, a rotary movement of the friction ring causes the at least one ball guided in the said ring ramps to be frictionally driven in the rotary direction (torque direction) of the friction ring, wherein the at least one ball quasi-runs up the ring ramps and brings about a translational movement (spreading apart) of the actuating ring and/or of the friction ring. Since the friction ring in the braking position of the spreading piston is touchingly supported on the friction braking device, i.e. axially locked, a load torque provided on the load gear can be transmitted by means of the friction braking device subject to sliding friction and/or adhesive friction, to the friction ring of the ball screw drive, wherein the ball screw drive translates the load torque introduced on the friction ring into a braking force dependent on the same.

It can be provided that the friction ring, on a side facing the friction braking device, carries a brake ring disc. By means of this brake ring disc, the friction ring can support itself on the friction braking device when the spreading piston is situated in its braking position and/or starting position.

Here, the term "ramp" practically describes a sloped track. The actuating ring ramp and/or the friction ring ball ramp can be practically comprised a slope embodied helically about the centre longitudinal axis. The respective slope can be configured, with respect to the rotary direction of a load torque provided on the load gear, in the same direction or in the opposite direction.

Furthermore, the at least one actuating ring ball ramp and/or the at least one friction ring ball ramp can be realised with a slope which is suitable for favouring or bringing about a self-locking of the friction brake. By way of this it is achieved that as soon as a load torque is provided on the friction ring, the at least one ball is wedged between friction ring and actuating ring so that a self-locking of the ball screw drive is achieved. This has the advantage that the spreading piston, even with a falling load torque or with an entirely absent load torque remains automatically locked by braking on the load gear.

It is practical, further, when the friction ring comprises at least one rotary stop for the non-rotatable fixing of the same. The at least rotary stop can be arranged on a circumferential outer ring edge of the friction ring and radially project away from the friction ring with respect to the centre longitudinal axis, wherein the at least one rotary stop is supportable or supported on an outer housing of the friction brake in a positive and/or non-positive manner. Practically, the friction ring has multiple rotary stops which are in particular evenly distributed over the outer ring edge of the friction ring and each protrude radially away from the friction ring. Because of this, the friction ring can be non-rotatably coupled, with simple design means, to the outer housing of the friction brake. Because of this, the rotary adjustability of the friction ring can be fixed to a certain angular range. It can be practical when the at least one rotary stop engages in a guide slot arranged on the outer housing, which allows a certain rotary mobility of the friction ring.

In order to be able to actively move the spreading piston back and forth as part of its working movement between its starting position and the at least one basic position it can be practically provided that the actuating device comprises a spindle device by means of which the spreading piston is moveable along the centre longitudinal axis. Because of this, the spreading piston can be moved reliably and with means that can be cost-effectively provided.

Furthermore, it can be provided that the spindle device comprises a threaded shaft that is arranged coaxially with respect to the centre longitudinal axis and electromotorically driveable and a spindle runner arranged with respect to the centre longitudinal axis, axially thereon. Because of this, a simple design that can be easily and cost-effectively realised is stated for the spindle device.

It is practical, furthermore, when the threaded shaft, via a worm gear of the friction brake, is coupled to an electric drive arrangeable or arranged on an outer housing of the friction brake. It can be preferably provided that the threaded shaft is electromotorically driveable or driven so that the spindle runner is moveable back and forth axially with respect to the centre longitudinal axis along the threaded shaft between an actuating position and a release position, axially spaced apart in this regard, wherein the spindle runner moving out of its release position into the actuation position is touchingly supported on the spreading piston driving the same. In other words, it can be practically provided during the operation of the friction brake that the spindle runner moves out of the said release position as far as to its actuation position while it comes touchingly in engagement with the spreading piston situated in its basic position, in particular its actuating ring. Because of this, the spindle runner is touchingly supported on the spreading piston. Further, the spindle runner drives the spreading piston out of its basic position adjusting it into its starting position, which is practically reached in particular when the spindle runner has reached its actuation position. In other words, the actuation position of the spindle runner and the starting position of the spreading piston coincide. Practically, axially between the spindle runner and the spreading piston, in particular its actuating ring, a disc spring oriented coaxially to the centre longitudinal axis can be arranged, via which the spreading piston can support itself on the spindle runner when it is driven by the same.

Practically it is provided that the actuating device comprises at least one spring device by means of which the spreading piston is moveable along the centre longitudinal axis. Practically, the spring device can be realised by a disc spring or a disc spring assembly, which supports itself on the one hand on the spreading piston and on the other hand on an outer housing of the friction brake. By means of the spring device, the spreading piston can be moved in particular out of its braking position and/or its starting position into the at least one basic position, so that the actuating device quasi has a resetter realised by a spring.

Furthermore, it can be provided that the actuating device comprises a locking device, which is equipped for locking, axially with respect to the centre longitudinal axis, the spreading piston moved into the braking position and/or starting position and for unlocking. The locking device can comprise a blocking ring that is moveable axially with respect to the centre longitudinal axis and moveable into at least one fixing position, at least one detent ball and an engagement wedge arranged on the spreading piston, in particular on its actuating ring, wherein the at least one detent ball is practically arranged radially with respect to the centre longitudinal axis between the engagement wedge of the spreading piston, in particular of the actuating ring, and the blocking ring. In order to actuate the locking device it can be provided that the spreading piston is moved into its braking position and/or starting position and the blocking ring into its fixing position, wherein the at least one detent ball is wedged radially with respect to the centre longitudinal axis inside on the engagement wedge of the spreading piston, in particular of the actuating ring, and radially outside on the blocking ring, so that the spreading piston, axially with respect to the centre longitudinal axis, is locked in its braking position and/or starting position. The blocking ring can be preloaded into its fixing position by means of a spring element supporting itself in particular on the outer housing of the friction brake, so that the locking of the spreading piston takes place automatically as soon as the spreading piston is moved into its braking position and/or its starting position. The said spring element can be realised by a disc spring or a coil spring. The term "locked" in terms of the invention practically means that an axial movement of the spreading piston with respect to the centre longitudinal axis is blocked completely and in particular free of play. By means of the explained locking, the spindle device can be relieved for example in the manner that its spindle runner adjusts the spreading piston into the starting position and, as soon as the spreading piston has arrived and been locked there, can subsequently move into further positions, in particular its release position in order to realise other functions.

It is practical, furthermore, when the said locking device for locking the spreading piston comprises a release device, which comprises a two-sided tilting lever that is adjustably arranged on the outer housing of the friction brake, which is coupleable on the one end to the blocking ring and on the other hand actuatable by means of the spindle runner of the spindle device. For unlocking, it can be practically provided that the spindle runner is moved into the release position, which can be comfortably controlled via the said electric drive by an external operator. The release device and the spindle device are matched to one another in terms of design so that the spindle runner actuates the said tilting lever as soon as the spindle runner has arrived in its release position. By actuation the tilting lever, the same is moved (tilted), as a result of which it comes into engagement with the blocking ring so that the same is adjusted axially with respect to the centre longitudinal axis, out of its fixing position in particular against the spring force of the said spring element, until the wedging between blocking ring, detent ball and spreading piston is released.

It can also be practical when the friction braking device furthermore comprises a freewheel which enables a deceleration and/or fixing of the load gear in a circumferential direction rotating round about the centre longitudinal axis and blocking the same in an opposite circumferential direction. In other words, the freewheel of the friction braking device accomplishes that the friction braking device merely acts in a single circumferential direction. While a deceleration/fixing of the load gear in the circumferential direction is released, i.e. a deceleration/fixing of the load gear is thus possible, a deceleration/fixing of the load gear in the opposite direction, in the counter-circumferential direction is blocked, i.e. a deceleration/fixing of the load gear is thus not possible.

Furthermore it can be provided that the friction braking device comprises a multiple-disc braking device which is mounted on the load gear longitudinally adjustably with respect to the centre longitudinal axis and non-rotatably with respect to a circumferential direction rotating about the centre longitudinal axis, and a brake disc device. The multiple-disc braking device by way of actuation can be frictionally coupleable to the brake disc device by means of the spreading piston. The brake disc device is practically fixed on an outer housing of the friction brake axially with respect to a housing centre axis of the outer housing arranged coaxially with respect to the centre longitudinal axis and with respect to the circumferential direction, mounted so as to be rotatably adjustable on the outer housing, wherein the rotary adjustability of the brake disc device in the circumferential direction is delimited by means of a housing rotary stop of the outer housing of the friction brake. The multiple-disc braking device can comprise annular discs arranged in the direction of the shaft longitudinal centre axis mutually spaced apart in series and, analogously, the brake disc device comprise brake ring discs arranged in the direction of the housing centre axis mutually spaced apart in series. The annular discs and the brake ring discs are alternately stacked along the centre longitudinal axis.

The said freewheel can be assigned to the brake disc device and/or formed by the same. It is practical when the freewheel is realised by the interaction of a bearing device supporting the brake disc device, viewed with respect to the housing circumferential direction, rotatably on the outer housing of the friction brake, and a housing rotary stop of the outer housing of the friction brake delimiting the rotary adjustability of the brake disc device round about the housing circumferential direction. Practically, the freewheel comprises on each brake ring disc of the brake disc device, engagement projections which project radially from a circumferential edge of the respective brake ring discs into circumferential slots of the outer housing of the friction brake. Practically, on each break ring disc and/or on each engagement projection a resetting spring can act which on the one hand is fixed on the outer housing of the friction brake and on the other hand on the engagement projections. Because of this, a spring force acting in the housing circumferential direction can be exerted on the individual brake ring discs in order to preload the brake ring discs against the housing rotary stop.

It can be practical when the friction braking device and the spreading piston are arranged coaxially with respect to the centre longitudinal axis. The friction braking device and the spreading piston, furthermore, can be arranged in series with respect to the centre longitudinal axis.

The invention can be based on the further idea of stating a vehicle power shift transmission of a vehicle that can be driveable by motor power and/or pedal power, in particular a bicycle, further in particular an electric bicycle, which comprises: at least one or exactly two or more friction brakes according to the preceding description, which are coupled or coupleable to a ring gear and/or a planet gear and/or a sun gear of the vehicle power shift transmission, directly or indirectly, for example with the interconnection of a clutch. According to the invention, an electrical bicycle is for example and E-bike in the case of which the motor power can be substantially independent of the pedal power, or an electric bicycle equipped with an electric auxiliary motor, in the case of which the motor power is employed so as to assist the pedal power in particular dependent on the vehicle speed. Because of this, an advantageous power shift transmission with a friction brake is stated.

In summary it should be noted: the present invention preferentially relates to a self-boosting friction brake for a vehicle power shift transmission comprising a load gear that is rotatably driveable about a centre longitudinal axis, which is assigned a friction braking device for decelerating and/or fixing the load gear, wherein the friction brake comprises an actuating device assigned to the friction braking device for actuating the same, which has an moveable spreading piston which, while performing a spread automatically materialising as a function of a load torque provided on the load gear, provides a braking force along the centre longitudinal axis for actuating the friction braking device. In addition, the invention practically relates to a vehicle power shift transmission having at least one such friction brake.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

FIG. 1 to 5 show preferred exemplary embodiments of a self-boosting friction brake 1 referred to in its entirety by the reference number 1, for a power shift transmission 2. All embodiments of the friction brake 1 have in common that they comprise a load gear 5 that is rotatably driveable about a centre longitudinal axis 4 indicated by dash-dotted line, in particular realised by a load gear wheel coupled or coupleable to a vehicle power shift transmission 2, which is assigned a friction braking device 6 of the friction brake 1 for decelerating and/or fixing the load gear 5. Furthermore, the friction brake 1 comprises an actuating device 7 assigned to the friction braking device 6 for actuating the friction braking device 6 along the centre longitudinal axis 4. The actuating device 7 has a spreading piston 8 that is adjustable axially with respect to the centre longitudinal axis 4, which while performing an axial spread 10, which materialises automatically as a function of a load torque 9 provided on the load gear 5, provides a braking force for actuating the friction braking device 6. The load torque 6 can be realised by a load moment.

Figure 1:
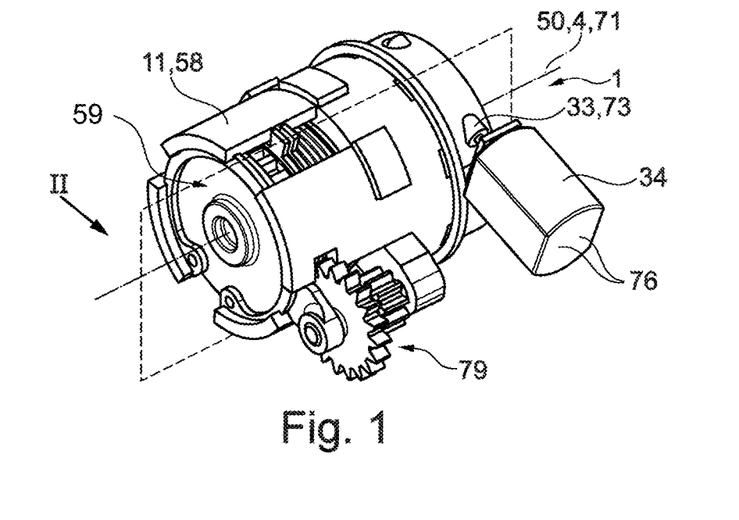
FIG. 1 a perspective view of a self-boosting friction brake according to the invention according to a preferred exemplary embodiment, FIG. 2 the self-boosting friction brake from FIG. 1 in a longitudinal section according to a plane drawn in there with dashed line in the viewing direction of an arrow II, FIG. 3 a highly simplified schematic representation of a self-boosting friction brake according to the invention according to a further preferred exemplary embodiment, FIG. 4 in a plan view an extract of the friction braking device of the self-boosting friction brake from FIG. 1 and, FIG. 5 a highly simplified representation of a vehicle power shift transmission equipped with two separate self-boosting friction brakes.

Looking at FIG. 1, a preferred exemplary embodiment of a self-boosting friction brake 1 is illustrated in a perspective view. In order to be able to better identify and discuss the components of the friction brake 1, the same is shown cut open along a section plane indicated in FIG. 1 by dashed line and looking in the direction of an arrow II in FIG. 2.

Figure 2:
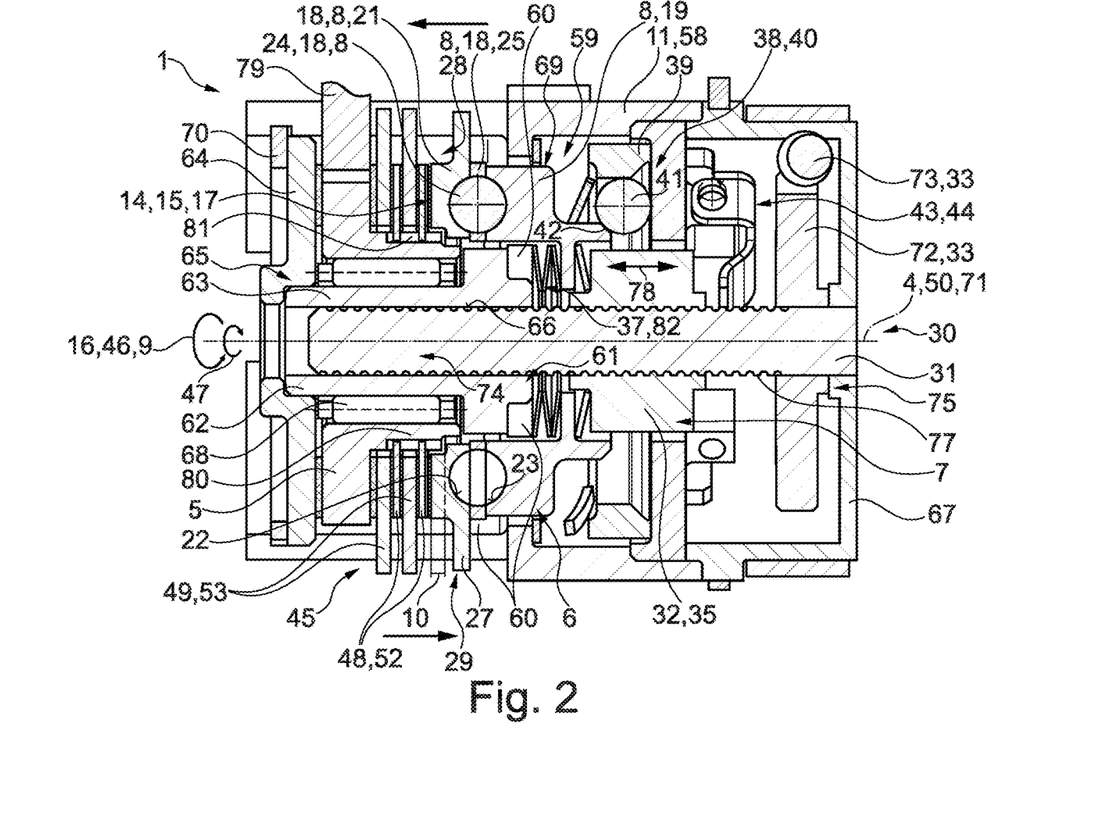

There it is noticeable that the friction brake 1 is equipped on the outside with a hollow-cylindrical outer housing 11, which in its main extent defines a housing centre axis 50 indicated in dash-dotted line and comprises a housing shell 58 coaxially enclosing the same which on the inside delimits or defines an installation space 59. The outer housing 11 comprises a housing intermediate wall 60 arranged integrally approximately centrally in the installation space 59 on the housing 58 which divides the installation space 59 transversely with respect to the housing centre axis 50, which housing intermediate wall 60 is equipped with an opening 61 central with respect to the housing centre axis 50, into which a bearing pin sleeve 63 is inserted, which with a bearing pin end 62 projects in the direction of the housing centre axis 50 away from the housing intermediate wall 60. Furthermore, a base element 64 with a central, bead-like bearing pin sleeve receptacle 65 which with respect to the outer housing 11 is formed separately and extends transversely with respect to the housing centre axis 50 is arranged on the outer housing 11. The base element 64 terminates the installation space 59 at one end, it can, for example, be supported on the housing shell 58 of the outer housing 11 by means of a locking ring 70 or similar means in order to block a movement of the same in an axial direction. The mentioned bearing pin sleeve 63, with its bearing pin end 62 upfront, is inserted into the bearing pin sleeve receptacle 65 of the base element 64 in a positive and/or non-positive manner. Because of this, the bearing pin sleeve 63 is axially enclosed between the housing intermediate wall 60 and the base element 64 and because of this axially as well as radially fixed relative to the outer housing 11.

Further making reference to the bearing pin sleeve 63 it should be noted that the same forms a central shaft bearing 66 in which a threaded shaft 31 arranged coaxially to the housing centre axis 50 and defining a threaded shaft centre axis 71 that is rotatably adjustable about the threaded shaft centre axis 71, is mounted with its one first threaded shaft end 74. The threaded shaft 31 is coupled on its other, second threaded shaft end 75 facing away from the shaft bearing 66 to a worm gear 72 of a worm drive 33 arranged completely in the installation space 59 and mounted on a cup-shaped housing cover 67 fixed radially inside on the housing shell 58 of the outer housing 11 that is mounted so as to be rotatably adjustable round about the threaded shaft centre axis 71. Altogether, this results in a rotatably adjustable mounting for the threaded shaft 31 with respect to the housing centre axis 50.

Besides the mentioned worm gear 72, the worm drive 33 furthermore comprises a worm shaft 73 which, oriented tangentially to the worm gear 72, meshes with the same so that a drive torque provided by an electric drive 34 illustrated in FIG. 1 attached to the outer housing 11 and/or to the housing cover 67, in particular realised by a drive moment, can be transmitted to the threaded shaft 31 via the worm gear 72-worm shaft 73 combination. The electric drive 34 can be controlled and/or regulated with a control and/or regulation 76 only indicated in FIG. 1 merely by a simple box, by a user or a superior control unit of a vehicle 3 which is not illustrated in FIGS. 1 and 2, so that the friction brake 1 can altogether be controlled relatively comfortably. Both the outer housing 11 and the housing cover 67 can be produced out of plastic, a composite material or out of a metal material. Depending on embodiment, merely the housing cover 67 can be produced out of plastic, a composite material or out of a metal material while the outer housing 11 is produced from a material distinct from that of the housing cover 67, for example in order to realise a lightweight friction brake 1. Purely exemplarily, housing centre axis 50 and centre longitudinal axis 4 are coaxial to one another.

Figure 3:
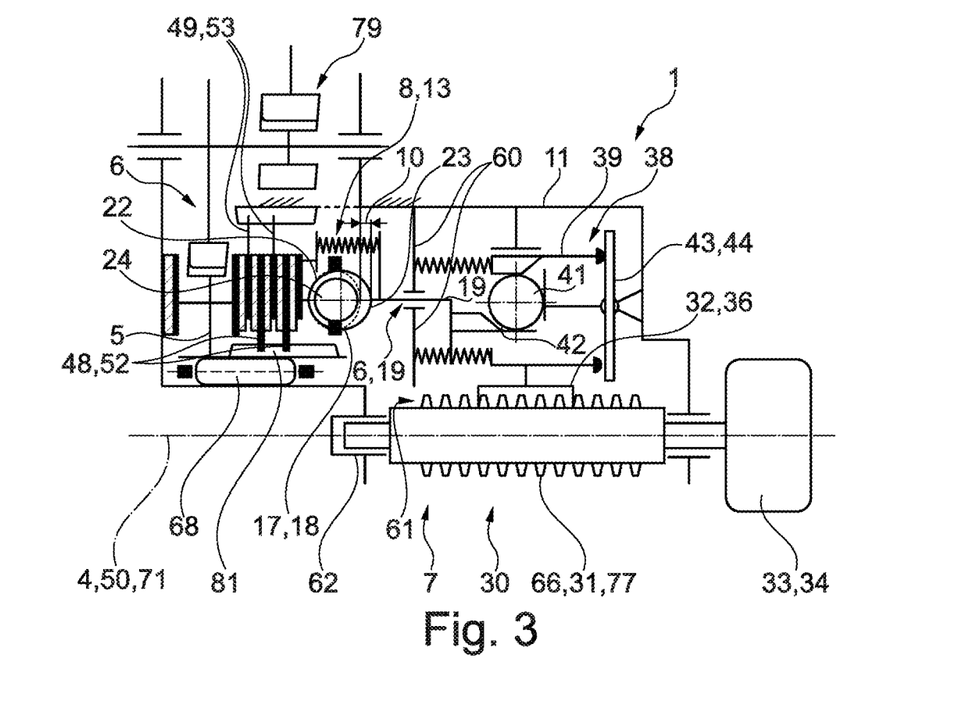
Figure 4:
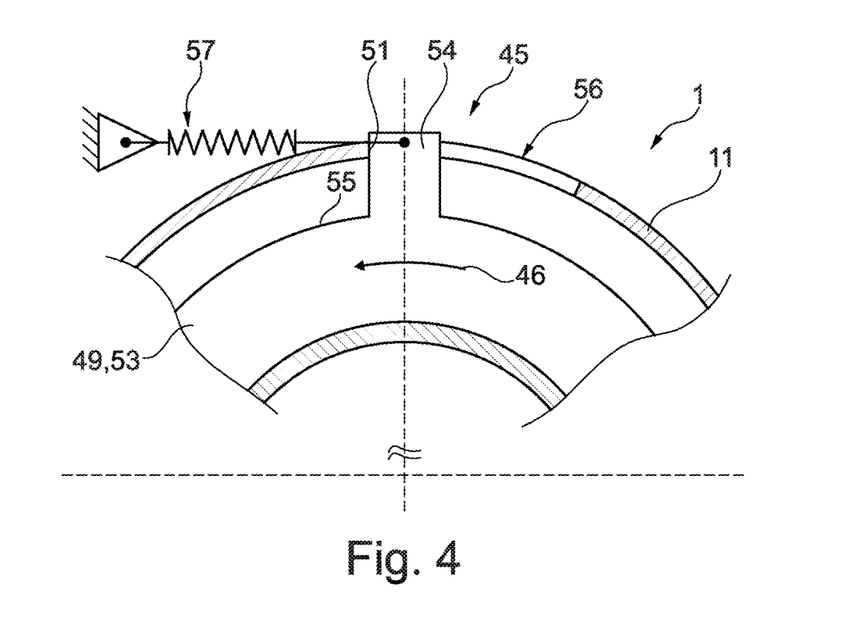

Again making reference to the threaded shaft 31 it should be explained that the friction brake 1 has a spindle runner 32, which with respect to the threaded shaft centre axis 71 is arranged so as to be axially moveable on the threaded shaft 31 where it interacts with an external thread 77 of the threaded shaft 31 so that as part of a runner movement 78, which in FIG. 2 is indicated by a double arrow, moves back and forth between an actuation position 35, see here FIG. 2, and a release position 36, see here FIG. 3, which is axially spaced apart in this regard, when the threaded shaft 31 is actuated by way of the electric drive 34. The threaded shaft 31 and the spindle runner 32 form a spindle device 30. The spindle device 30 or the spindle runner 32 can, as part of the runner movement 78, move the spreading piston 8 mentioned at the outset along the housing centre axis 50 or the centre longitudinal axis 4 back and forth between a starting position 14 still explained further down below and at least one basic position 13.

In FIG. 2 it is noticeable, furthermore, that the friction brake 1 comprises the mentioned load gear 5 exemplarily realised by a load gear wheel. The load gear 5 exemplarily encloses the bearing pin sleeve 63 coaxially and is mounted on the same via a needle bearing 68 or another suitable bearing, in particular a rolling bearing or a sliding bearing, so as to be rotatably adjustable about the centre longitudinal axis 4. The load gear 5 can, at least theoretically, be axially moveable to a certain degree with respect to the centre longitudinal axis 4 or alternatively be fixed axially. In this context it is provided that the friction brake 1 is equipped with a coupling gear wheel device 79 arranged from the outside on the outer housing 11, which exemplarily is a double gear wheel, which in FIG. 2 is only indicated in the form of an extract and in FIG. 1 perspectively. The coupling gear wheel device 79 meshes on the one hand with the load gear 5 and on the other hand with a planetary gear 85 indicated in FIG. 5 and/or a clutch 86 of a vehicle power shift transmission 2, as a result of which a torque provided there by the power shift transmission 2, in particular a moment, can be transmitted to the load gear 5 and provided as load torque 9, in particular as load torque.

In order to be able to absorb the load torque 9 provided on the load gear 5, i.e. in this case in order to be able to decelerate and/or fix the load gear 5, the friction brake 1 comprises the friction braking device 6 mentioned at the outset for decelerating and/or fixing the load gear 5. The friction braking device 6 in turn is equipped with a brake disc device 49, and a multiple disc device 48 that is axially moveable in this regard, wherein the multiple disc device 48 can be touchingly coupled flat to the brake disc device 49 in a frictionally engaging manner through axial actuation by means of the spreading piston 8. The said multiple disc device 48 has multiple ring discs 52 arranged in the direction of the shaft longitudinal centre axis 4 mutually spaced apart in series, which can be lining discs that can be provided for example with a friction lining. The ring discs 52 coaxially enclose a load gear axial projection 80 of the load gear 5 projecting away from the load gear 5 in the direction of the centre longitudinal axis 4 and are mounted on the same so as to be axially moveable at least to a certain degree and non-rotatably mounted with respect to a circumferential direction 46 rotating about the centre longitudinal axis 4. Purely exemplarily, an axially moveable radial mounting 81 is suitable here, which in practice is also referred to as a shaft-hub connection. Further exemplarily, the ring discs 52 can be arranged on a spline connection of the load gear axial projection 80 so as to be axially moveable and radially non-rotatable. The said brake disc device 49 consists of multiple brake ring discs 53 arranged in the direction of the housing centre axis 50 mutually spaced apart in series behind one another which can each be realised by a steel disc. In direct comparison, the said lining discs 52 (optionally with friction lining) are embodied thinner than the steel discs 53, since the latter are equipped in particular for absorbing the friction energy during braking. The brake ring discs 53 are each fixed on the outer housing 11 axially with respect to the housing centre axis 50 and mounted on the outer housing 11 so as to be rotatably adjustable in the circumferential direction 46, as a result of which a freewheel function (freewheel 45) is provided. Its respective rotary adjustability in the circumferential direction 46 however is limited by means of a housing rotary stop 51, see in particular FIG. 4, so that the brake ring discs 53 can each be rotatably adjusted in the circumferential direction 46 only by a specifiable angular range. The brake ring discs 53 and the ring discs 52 are alternatingly stacked onto one another so that a brake ring disc 53 is situated axially opposite a ring disc 52 in each case. Because of this, the ring discs 52 can be axially coupled to or decoupled from the brake ring discs 53 by actuating the spreading piston 8 in a frictionally-engaging manner. The freewheel 45 makes possible a deceleration and/or fixing of the load gear 5 in the circumferential direction 46, while it prevents the deceleration and/or fixing of the load gear 5 in a counter-circumferential direction 47. Exemplarily, the freewheel 45 comprises on each brake ring disc 53, engagement projections 54 also referred to as lugs in practice, which radially project with respect to the centre longitudinal axis 4 from circumferential edges 55 of the respective brake ring discs 53 and project into circumferential slots 56 of the outer housing 11 of the friction brake 1 also referred to as grooves in practice. The engagement projections 54 or the lugs are guided in the circumferential slots 56 referred to as grooves, so that the brake ring discs 53 of the brake disc device 49 are rotatably adjustable circumferentially to a certain degree specified or specifiable by the circumferential length of the grooves/circumferential slots 56. The engagement projections 54 or lugs are equipped, furthermore, in order to lock the brake ring discs 53 against rotation when the brake ring discs 53 are rotated beyond the specified or specifiable degree of circumferential rotatable adjustability. Practically, the freewheel 45 can comprise resetting springs 57 which act on each brake ring disc 53 and/or on each engagement projection 54 as well as on the outer housing 11 in order to preload the individual brake ring discs 53 in the circumferential direction 46 against a housing rotary stop 51 of the outer housing 11. Basically, the purpose of the freewheel 45 is to block a rotary direction of the load gear 5 while the other one is released. The load gear 5 is released in that the brake ring discs 53 are turned back a little which is possible by their being guided in the grooves or circumferential slots 56, as a result of which by way of this rotary movement of the brake ring discs 53 the friction ring ball ramp 22 reduces the lining force as a result of which the friction brake 1 opens.

The purpose of the resetting spring 57 is to again apply the brake ring discs 53 to the housing rotary stop 51 with utilised freewheel function (i.e. upon an opening against the circumferential direction 46) with opened friction brake 1. The reason for this is that the friction brake 1 is to again instantaneously block when the direction of rotation again reverses (i.e. in the circumferential direction 46). The friction ring ball ramp 22 again spreads but a torque is only supportable when a friction force can be built up and the torque be directed to the outer housing 11 via the brake ring discs 53. By applying the engagement projections 54 or lugs by way of the resetting spring 57, the load torque 9 can be again absorbed immediately upon a direction of rotation reversal.

In order to be able to absorb the load torque 9 provided on the load gear 5 or decelerate and/or fix the load gear 5 it is provided that the friction braking device 6 is actuatable. This is achieved in that the said multiple disc device 48 of the friction braking device 6 is axially moveable with respect to the shaft longitudinal centre axis 4 by means of the spreading piston 8 to the brake disc device 49 of the friction braking device 6. When the multiple disc device 48 is actuated, the spreading piston 8, performing an axial spread 10 automatically materialising as a function of the load torque 9 provided on the load gear 5 along the centre longitudinal axis 4, provides a braking force for actuating the friction braking device 6. Because of this, the friction brake 1 can automatically adapt to the load torque 9 to be absorbed provided on the load gear 5 and provide an optimal braking force. The term "automatically" can mean that no external means for providing or controlling the braking force of the friction braking device 6 are employed, in particular no external electronic aids.

According to FIG. 1 to 3 it is noticeable that the spreading piston 8 is embodied in multiple parts, namely a first part facing the housing cover 67 and referred to as actuating ring 19 and a second part facing the base element 64 referred to as screw drive 17. With respect to the arrangement of the spreading piston 8 in the outer housing 11 it has to be explained that the housing intermediate wall 60 of the outer housing 11 beside the central opening 61 comprises a separate ring opening 69 angularly enclosing the same coaxially, into which the spreading piston 8 is axially inserted so that it is mounted so as to be axially moveable. Here, the screw drive 17 is realised by a ball screw drive 18 also describable as ball ramp spreading mechanism, which is arranged on an actuating ring 19 of the spreading piston 8 or formed by the same. According to FIG. 2 it is noticeable that the ball screw drive 18 has a friction ring 21 arranged coaxially to the centre longitudinal axis 4, which is axially moveable longitudinally with respect to the actuating ring 19 and rotatably adjustable to a certain degree in the circumferential direction 46 with respect to the actuating ring 19, which friction ring 21 comprises at least one friction ring ball ramp 22 of circular or arcuate configuration. The friction ring 21 can exemplarily comprise at least one rotary stop 27 equipped for the non-rotatable coupling of the friction ring 21 to the outer housing 11. Here, the at least one rotary stop 27 is arranged on a circumferential outer ring edge 28 of the friction ring 21 and projects radially with respect to the centre longitudinal axis 4 away from the friction ring 21. The at least one rotary stop 27 can engage into a guide slot 29 arranged on the outer housing 11, which allows a certain rotary movability of the friction ring 21 so that the rotary adjustability of the same is limited or limitable to a specified angular range. Furthermore, the ball screw drive 18 comprises an actuating ring ball ramp 23 of circular or arcuate configuration arranged on the actuating ring 19 and a ball ring cage 25 arranged coaxially to the centre longitudinal axis 4 carrying at least one ball 24. In the assembled state of the friction brake 1, the friction ring 21, with the interconnection of the ball ring cage 25 is arranged on the actuating ring 19, so that the ball ring cage 25 is arranged quasi sandwich-like between the friction ring 21 and the actuating ring 19. Because of this, the said ball 24 engages both into the friction ring ball ramp 22 as well as into the actuating ring ball ramp 23 and is guided by these. The ball cage 25 holds the balls 25 under all circumstances, i.e. in particular in any conceivable operating state of the friction brake 1, at a same distance from one another, in particular in the circumferential direction 46, axially as well as radially with respect to the centre longitudinal axis 4, so that they all run synchronously and can be loaded with the same force. During the operation of the friction brake 1, i.e. upon actuation of the friction braking device 6 by the actuating device 7, it is provided that the spreading piston 8 is moveable back and forth between the mentioned at least one basic position 13, see FIG. 3, in which it is lifted off the friction braking device 6, so that the friction braking device 6 is quasi deactivated and the load gear 5 released without deceleration, and a likewise already mentioned starting position 14 spaced apart in the direction of the centre longitudinal axis 4 in this regard, in which the spreading piston 8 with its friction ring 21 merely lies against the friction braking device 6 with slight contact and the load gear 5 is released without deceleration or practically without deceleration. As soon as the spreading piston 8 is moved into the starting position 14, it automatically changes, due to friction, out of the said starting position 14 into a braking position 15, see FIG. 2, in which the spreading piston 8 is touchingly supported on the friction braking device 6 while imparting a braking force and the load gear 5 is decelerated or locked. In the braking position 15, an amount of the braking force is provided as a function of the load torque 9 provided on the load gear 5 in that the load torque 9 is transmitted from the load gear 5 via the friction braking device 6 subject to sliding friction and/or adhesive friction as actuating torque 16 to the friction ring 21 of the screw drive 17 of the spreading piston 8, wherein the screw drive 17 translates the provided actuating torque 16 into the said axial spread 10 of the spreading piston 8 alongside the centre longitudinal axis 4 and a load torque-dependent braking force. Practically, merely a relatively small part of the load torque 9 is transmitted via the friction ring 21. A remaining residual amount of the load torque 9 is directly discharged or transmitted to the outer housing 11 via the brake ring discs 53. The provided braking force is spontaneously adapted to any growing load torque 9 without a further actuation of the spreading piston 8 by means of the actuating device 7 being necessary, in that the friction ring 21 is at least minimally rotated relative to the actuating ring 19 in the circumferential direction 46, as a result of which the at least one ball 24 of the ball ring cage 25 is driven by the friction ring 21 in the circumferential direction 46 against the slope of the friction ring ball ramp 22 and the slope of the actuating ring ball ramp 23, so that the friction ring 21 is minimally adjusted axially relative to the actuating ring 19 and/or a braking force boost is achieved. This has the effect that the spreading piston can automatically, i.e. without actuation by means of the actuating device 7, provide a braking force adapted to a rising load torque 9. It can be said: for as long as the friction brake 1 slips, the friction ring ball ramp 22 will rotate and increase the braking force.

When the friction ring ball ramp 22 no longer slips, the system is exactly in equilibrium, i.e. the braking force corresponds exactly to the load torque 9. The screw drive 17 thus allows translating a rotary movement (load torque 9 or actuating torque 16) of the friction ring 21 relative to the actuating ring 19 into a translational actuating movement (spread 10) of the friction ring 21 relative to the centre longitudinal axis 4. Axially, with respect to the shaft longitudinal centre axis 4, between the actuating ring 19 and the housing intermediate wall 60, a spring device 37 exemplarily realised by a disc spring assembly 82 is arranged, by means of which the spreading piston 8 is moveable along the centre longitudinal axis 4 and which on the one hand supports itself on an annular surface of the housing intermediate wall 60 oriented in the direction of the shaft longitudinal centre axis 4 towards the housing cover 67 radially delimited between the central opening 61 of the housing intermediate wall 60 and the ring opening 69 of the housing intermediate wall 60 and on the other hand on the actuating ring 19. Because of this, the spreading piston 8 can be preloaded in the direction of the shaft longitudinal centre axis 4 into its basic position 13.

The actuating device 7 of the friction brake 1, furthermore, comprises a locking device 38, which is equipped for locking axially with respect to the centre longitudinal axis 4 the spreading piston 8 that is moveable into the braking position 15 and/or starting position 14 and for unlocking. The locking device 38 for this purpose comprises a blocking ring 39 that is axially moveable with respect to the centre longitudinal axis 4 and moveable into at least one fixing position 40, at least one detent ball 41 and an engagement wedge 42 arranged on the spreading piston 8, in particular on the actuating ring 19 of the same. In FIG. 2 it is noticeable that the detent ball 41 is arranged radially with respect to the centre longitudinal axis 4 between the engagement wedge 42 of the spreading piston 8 and the blocking ring 39. In the actuated position of the locking device 38, the spreading piston 8 is moved into its braking position 15 and/or starting position 14, and the blocking ring 39 into its fixing position 40, wherein the detent ball 41 is wedged radially with respect to the centre longitudinal axis 4 inside on the engagement wedge 42 of the spreading piston 8 and radially outside on the blocking ring 39. Because of this, the spreading piston 8 is locked without play axially with respect to the centre longitudinal axis 4 in its braking position 15 and/or starting position 14. For unlocking the spreading piston 8, the locking device 38 is equipped with a release device 43 which comprises a two-sided tilting lever 44 that is adjustably mounted on the outer housing 11 of the friction brake 1, which on the one end is coupleable to the blocking ring 39 and on the other end actuatable by means of the said spindle runner 32 of the spindle device 30. For releasing the locking device 38 it is exemplarily provided that the spindle runner 32 is moved into its release position 36, which can be comfortably controlled for example by an external operator via the said electric drive 34. The release device 43 and the spindle device 30 are matched to one another by design so that the spindle runner 32 actuates the said tilting lever 44 as soon as the spindle runner 32 has arrived in its release position 36. By actuating the tilting lever 44 the same is tilted, causing it to come into engagement with the blocking ring 39, which because of this is moved axially with respect to the centre longitudinal axis 4 out of its fixing position 40 until the wedging between blocking ring 39, detent ball 41 and spreading piston 8 is released.

Figure 5:
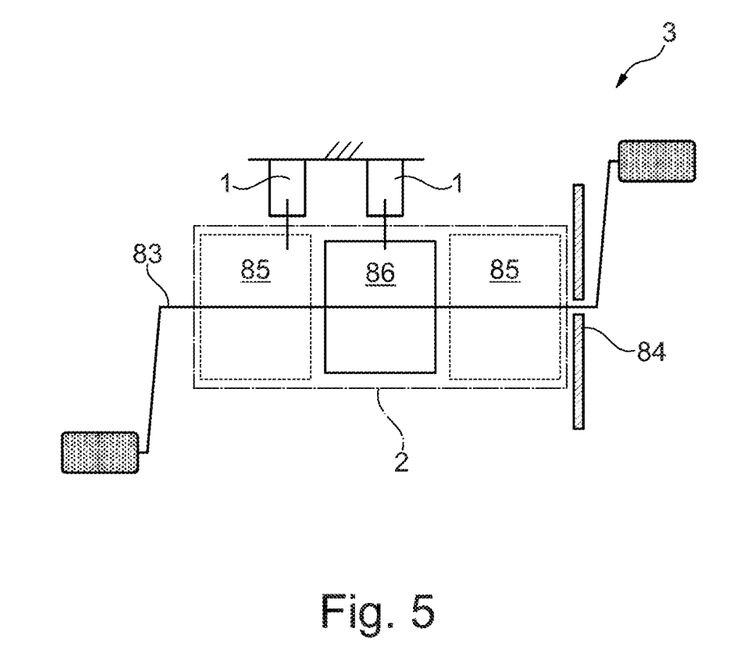

FIG. 5 shows in a highly simplified representation a vehicle power shift transmission 2 equipped with two separate self-boosting friction brakes 1 of a vehicle 3 that is driveable by motor power and/or pedal power, in particular a bicycle, further in particular an electric bicycle. The friction brakes 1 are coupleable or coupled to a ring gear and/or a planet gear and/or sun gear of a planetary gear 85 of the vehicle power shift transmission 2 and a clutch 86 of the vehicle power shift transmission 2, in order to shift the same. Because of this, a drive torque introduced or introducible on the vehicle power shift transmission 2 on a drive 83 of the vehicle power shift transmission 2 can be transmitted to an output 84 of the vehicle power shift transmission 2 in a transmission ratio settable by gears.

The invention claimed is:

1. A friction brake for a vehicle power shift transmission, comprising:
   a load gear that is rotatably driveable about a centre longitudinal axis;
   a friction braking device for decelerating and/or fixing the load gear;
   an actuating device for actuating the friction braking device, the actuating device includes an moveable spreading piston;
   wherein the moveable spreading piston while performing a spread along the centre longitudinal axis automatically materialising as a function of a load torque provided on the load gear, provides a braking force for actuating the friction braking device.

2. The friction brake according to claim 1, wherein:
   the spreading piston is moveable back and forth between at least one basic position in which the piston is lifted off the friction braking device and the load gear is released without deceleration, and a starting position spaced apart in a direction of the centre longitudinal axis, in which the spreading piston touchingly lies against the friction braking device and the load gear is released without deceleration or practically without deceleration;
   the spreading piston changes automatically out of the said starting position into a braking position in which the spreading piston is touchingly supported on the friction braking device while imparting a braking force and the load gear is decelerated or locked;
   in the braking position the braking force is provided as a function of a load torque provided on the load gear, the load torque is transmitted via the friction braking device subject to sliding friction and/or adhesive friction as actuating torque to a screw drive of the spreading piston; and
   the screw drive translates the provided actuating torque into the spread of the spreading piston along the centre longitudinal axis and the braking force.

3. The friction brake according to claim 2, wherein the screw drive or a ball screw drive is arranged on an actuating ring of the spreading piston; and
   at least one of the screw drive, the ball screw drive, the friction braking device, a spindle device, and a spindle runner is equipped to achieve a self-locking effect.

4. The friction brake according to claim 1, wherein the spreading piston includes a screw drive that at least one of defines the spread along the centre longitudinal axis and is defined by a ball screw drive.

5. The friction brake according to claim 4, wherein the ball screw drive includes:
   a friction ring arranged coaxially to the centre longitudinal axis, the friction ring is longitudinally moveable axially with respect to an actuating ring of the spreading piston and is rotatably adjustable with respect to the actuating ring round about the centre longitudinal axis in a circumferential direction, and the friction ring has at least one friction ring ball ramp of circular or arcuate configuration;
   at least one actuating ring ball ramp of circular or arcuate configuration arranged on the actuating ring; and
   a ball ring cage carrying at least one ball arranged coaxially to the centre longitudinal axis;
   wherein in an assembled state of the friction brake, the friction ring is arranged with an interconnection of the ball ring cage on the actuating ring wherein the ball ring cage is arranged between the friction ring and the actuating ring such that the at least one ball dips into the at least one friction ring ball ramp and the at least one actuating ring ball ramp; and
   wherein the friction ring, in the braking position of the spreading piston, is touchingly supported on the friction braking device while imparting a braking force.

6. The friction brake according to claim 5, wherein at least one of the at least one actuating ring ball ramp and the at least one friction ring ball ramp include a slope for a self-locking effect.

7. The friction brake according to claim 5, wherein the friction ring includes at least one rotary stop for non-rotatable locking; and
   the at least one rotary stop is arranged on a circumferential outer ring edge of the friction ring and radially with respect to the centre longitudinal axis projects away from the friction ring, the at least one rotary stop supported on an outer housing of the friction brake in a positive and/or non-positive manner.

8. The friction brake according to claim 1, wherein the actuating device includes a spindle device for moving the spreading piston along the centre longitudinal axis.

9. The friction brake according to claim 8, wherein the spindle device includes an electromotorically driveable threaded shaft arranged coaxially with respect to the centre longitudinal axis and a spindle runner that is axially moveable with respect to the centre longitudinal axis.

10. The friction brake according to claim 9, wherein:
   the threaded shaft is coupled via a worm drive of the friction brake to an electric drive that is arrangeable or arranged on an outer housing of the friction brake;
   the threaded shaft is electromotorically driveable such that the spindle runner is moveable back and forth axially with respect to the centre longitudinal axis along the threaded shaft between an actuation position and a release position; and
   wherein the spindle runner moving out of the release position into the actuation position is touchingly supported on the spreading piston.

11. The friction brake according to claim 1, wherein the actuating device includes a spring device for moving the spreading piston along the centre longitudinal axis and/or floatingly mounted along the centre longitudinal axis.

12. The friction brake according to claim 1, wherein:
the actuating device comprises a locking device for locking the spreading piston into a braking position and/or a starting position and for unlocking;
the locking device includes a blocking ring that is moveable axially with respect to the centre longitudinal axis and moveable into at least one fixing position, at least one detent ball, and an engagement wedge arranged on the spreading piston; and
the at least one detent ball is arranged radially with respect to the centre longitudinal axis between the engagement wedge and the blocking ring, the locking device is actuated such that the spreading piston is moved into the braking position and/or the starting position and the blocking ring into the fixing position, and the at least one detent ball is wedged radially with respect to the centre longitudinal axis inside on the engagement wedge and radially outside on the blocking ring such that the spreading piston is locked axially with respect to the centre longitudinal axis in the braking position and/or the starting position.

13. The friction brake according to claim 12, wherein the locking device includes a release device having a two-sided tilting lever moveably arranged on an outer housing of the friction brake, which at one end is coupleable to the blocking ring and at the other end actuatable by a spindle runner of a spindle device.

14. The friction brake according to claim 1, wherein the friction braking device includes at least one of:
a freewheel that enables a deceleration and/or fixing of the load gear in a circumferential direction rotating round about the centre longitudinal axis, blocking the same in a counter-circumferential direction; and
a multiple disc device that is mounted axially with respect to the centre longitudinal axis so as to be longitudinally moveable and non-rotatable on the load gear and a brake disc device, the multiple disc device through actuation by the spreading piston is frictionally coupleable to the brake disc device, the brake disc device is fixed on an outer housing of the friction brake axially with respect to a housing centre axis of the outer housing arranged coaxially with respect to the centre longitudinal axis and mounted so as to be rotatably adjustable on the outer housing with respect to a circumferential direction rotating about the centre longitudinal axis, rotary adjustability of the brake disc device is limited in the circumferential direction by a housing rotary stop of the outer housing of the friction brake;
wherein the multiple disc device includes multiple ring discs arranged spaced apart in series, and the brake disc device includes brake ring discs arranged spaced apart in series, and wherein the multiple ring discs and the brake ring discs alternatingly engage into one another.

15. A vehicle power shift transmission of a vehicle that is driveable by motor power and/or pedal power, comprising:
at least one friction brake, the at least one friction brake including:
a load gear that is rotatably driveable about a centre longitudinal axis;
a friction braking device for decelerating and/or fixing the load gear;
an actuating device for actuating the friction braking device, the actuating device includes an moveable spreading piston that is adjustable axially with respect to the centre longitudinal axis;
wherein the moveable spreading piston, while performing a spread along the centre longitudinal axis that materializes automatically as a function of a load torque provided on the load gear, provides a braking force for actuating the friction braking device;
wherein the at least one friction brake is directly or indirectly coupled to at least one of a ring gear, a planet gear, and a sun gear of the vehicle power shift transmission.

16. The vehicle power shift transmission according to claim 15, wherein:
the spreading piston is moveable back and forth between at least one basic position in which the piston is lifted off the friction braking device and the load gear is released without deceleration, and a starting position spaced apart in a direction of the centre longitudinal axis, in which the spreading piston touchingly lies against the friction braking device and the load gear is released without deceleration or practically without deceleration;
the spreading piston changes automatically out of the starting position into a braking position in which the spreading piston is touchingly supported on the friction braking device while imparting a braking force and the load gear is decelerated or locked;
in the braking position the braking force is provided as a function of a load torque provided on the load gear, the load torque is transmitted via the friction braking device subject to sliding friction and/or adhesive friction as actuating torque to a screw drive of the spreading piston; and
the screw drive translates the provided actuating torque into a spread of the spreading piston along the centre longitudinal axis and a braking force.

17. The vehicle power shift transmission according to claim 15, wherein the spreading piston includes a screw drive that at least one of defines the spread along the centre longitudinal axis and is defined by a ball screw drive.

18. The vehicle power shift transmission according to claim 17, wherein the screw drive or a ball screw drive is arranged on an actuating ring of the spreading piston; and
at least one of the screw drive, the ball screw drive, the friction braking device, a spindle device, and a spindle runner is equipped to achieve a self-locking effect.

19. The vehicle power shift transmission according to claim 18, wherein the ball screw drive includes:
a friction ring arranged coaxially to the centre longitudinal axis, the friction ring is longitudinally moveable axially with respect to an actuating ring of the spreading piston and is rotatably adjustable with respect to the actuating ring round about the centre longitudinal axis in a circumferential direction, and the friction ring has at least one friction ring ball ramp of circular or arcuate configuration;
at least one actuating ring ball ramp of circular or arcuate configuration arranged on the actuating ring; and
a ball ring cage carrying at least one ball arranged coaxially to the centre longitudinal axis;
wherein in an assembled state of the friction brake, the friction ring is arranged with an interconnection of the ball ring cage on the actuating ring;
wherein the ball ring cage is arranged between the friction ring and the actuating ring such that the at least one ball dips into the at least one friction ring ball ramp and the at least one actuating ring ball ramp;

wherein the friction ring, in the braking position of the spreading piston, is touchingly supported on the friction braking device while imparting a braking force;

wherein the friction ring includes at least one rotary stop for non-rotatable locking; and the at least one rotary stop is arranged on a circumferential outer ring edge of the friction ring and radially with respect to the centre longitudinal axis projects away from the friction ring, the at least one rotary stop supported on an outer housing of the friction brake in a positive and/or non-positive manner.

20. The vehicle power shift transmission according to claim 19, wherein at least one of the at least one actuating ring ball ramp and the at least one friction ring ball ramp include a slope for a self-locking effect.

* * * * *